No. 889,296. PATENTED JUNE 2, 1908.
L. & J. A. CARTER.
END GATE FASTENER.
APPLICATION FILED JUNE 15, 1907.

Inventors
Leon Carter,
J. A. Carter,

Witnesses

By

UNITED STATES PATENT OFFICE.

LEON CARTER AND JOHN A. CARTER, OF ASHERVILLE, KANSAS.

END-GATE FASTENER.

No. 889,296.  Specification of Letters Patent.  Patented June 2, 1908.

Application filed June 15, 1907. Serial No. 379,293.

*To all whom it may concern:*

Be it known that we, LEON CARTER and JOHN A. CARTER, citizens of the United States, residing at Asherville, in the county of Mitchell and State of Kansas, have invented certain new and useful Improvements in End-Gate Fasteners, of which the following is a specification.

The present invention relates to certain new and useful improvements in the construction of end gates for vehicles, and more particularly to that type of end gates comprising two hinged sections one of which is formed with an extension designed to be clamped against the opposite section in order to hold the two sections in alinement with each other.

The object of the invention is to design a strong and durable end gate of this type which will not become unfastened or work loose so as to rattle when the vehicle is passing over a rough road, and which is at the same time inexpensive in construction.

Figure 1:
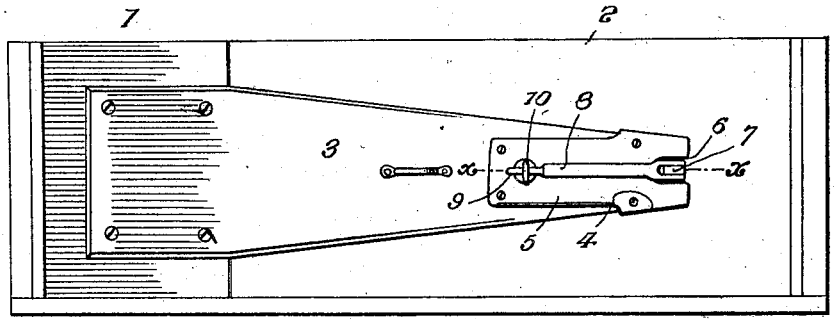
Figure 2:
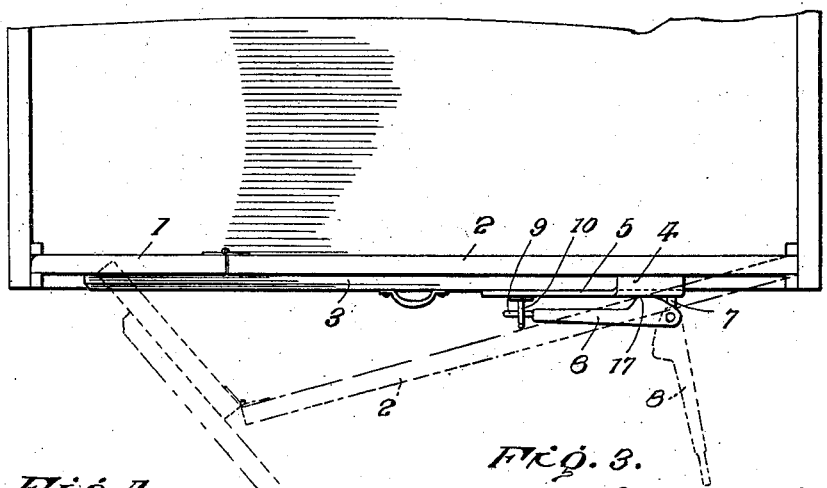
Figure 4:
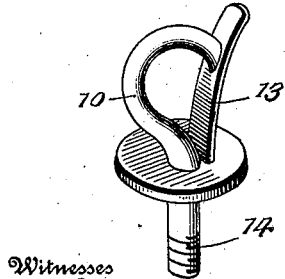
Figure 3:
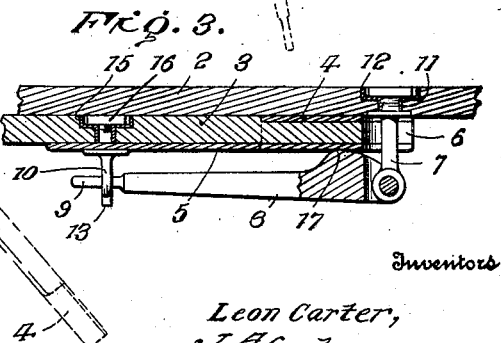

For a full description of the invention and the merits thereof and also to acquire a knowledge of the details of construction and the means for effecting the result, reference is to be had to the following description and accompanying drawings, in which:

Figure 1 is a plan view of an end gate embodying the invention. Fig. 2 is a top view showing the gate as closed in full lines and open in dotted lines. Fig. 3 is an enlarged section view of the operating lever and coöperating elements. Fig. 4 is an enlarged detail view of the spring catch.

Corresponding and like parts are referred to in the following description and indicated in all the views of the drawings by the same reference characters.

The body portion of the end gate is similar in construction to those in common use and comprises the two hinged sections 1 and 2, the section 2 being preferably somewhat longer than the section 1. Carried by the shorter section 1 is an extension 3 which is designed to fit against the outer face of the longer section 2 when the two sections are swung into alinement with each other. The end portion of the extension 3 is tapered and is received within a metallic sleeve 4, the outer side of which is formed with an enlargement 5 which constitutes a protective covering for the outer face of the extension 3. A notch 6 is located at the extremity of the extension 3 and is designed to receive an arm 7 projecting from the section 2 of the end gate. Pivotally mounted upon the extremity of the arm 7 is a locking lever 8, the extremity of the said locking lever being reduced as indicated at 9 and designed to be engaged by a spring catch 10 upon the extension 3.

Specifically describing the arm 7 it will be observed that the same is in the nature of an eye bolt extending through a bushing 11, the outer portion of the bushing being provided with an annular flange 12 which is countersunk in the end gate and effectively prevents the bushing from pulling through the same.

The spring catch 10 comprises a hook member designed to engage the reduced end 9 of the locking lever 8, and a spring guard 13 operating to prevent accidental disengagement of the locking lever and hook member. It will also be observed that the spring catch is formed with a shank 14 passing through a bushing 15 similar to the before mentioned bushing 11 and capped by a nut 16.

The portion of the locking lever 8 adjacent the pivot end thereof is formed with a cam 17 which is designed to engage the extension 3 and clamp the same tightly against the section 2 of the end gate. Attention is directed to the fact that with this construction the extension is prevented from splitting by means of the sleeve 4 and is shielded from the wear due to the action of the cam 17 by the enlargement 5 upon one side of the sleeve 4. It may also be mentioned that owing to the fact that the extension is tightly clamped against the end gate the various members are prevented from rattling while the vehicle is passing over a rough road.

Having thus described the invention, what is claimed as new is:

1. An end gate comprising a pair of hinged sections, an extension carried by one of the sections and having the extremity thereof notched, a sleeve receiving the notched end of the extension, an arm projecting from the opposite section and designed to be received within the said notch, a locking lever pivotally connected to the arm and provided with a cam for engaging the sleeve, and means carried by the extension for holding the lever in an operative position.

2. An end gate comprising a pair of hinged sections, an extension carried by one of the sections, a sleeve receiving the end portion of the extension, a lever carried by the opposite section of the end gate and provided with a cam engaging the sleeve, and a catch carried by the extension for holding the locking lever in an operative position.

3. An end gate comprising a pair of hinged sections, an extension carried by one of the sections, a sleeve receiving the end portion of the extension and formed upon its outer side with an enlargement, a lever carried by the opposite section and provided with a cam designed to engage the enlargement of the sleeve, and a spring catch mounted upon the extension and operating to engage the locking lever.

In testimony whereof we affix our signatures in presence of two witnesses.

LEON CARTER. [L. S.]
JOHN A. CARTER. [L. S.]

Witnesses:
 SOLON STEERE,
 WILLIAM E. SHULL.